(12) United States Patent
Chen et al.

(10) Patent No.: US 9,190,909 B2
(45) Date of Patent: Nov. 17, 2015

(54) CONTROL DEVICE FOR MULTIPHASE INTERLEAVED DC-DC CONVERTER AND CONTROL METHOD THEREOF

(71) Applicant: NATIONAL TAIWAN UNIVERSITY, Taipei (TW)

(72) Inventors: Yaow-Ming Chen, Taipei (TW);
Hung-Jyun Chen, Taipei (TW);
Yang-Lin Chen, Taipei (TW);
Kwang-Hwa Liu, Sunnyvale, CA (US)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 211 days.

(21) Appl. No.: 14/017,662

(22) Filed: Sep. 4, 2013

(65) Prior Publication Data

US 2014/0334196 A1    Nov. 13, 2014

(30) Foreign Application Priority Data

May 10, 2013    (TW) .............................. 102116773 A

(51) Int. Cl.
*G05F 1/00*        (2006.01)
*H02M 3/158*    (2006.01)
*H02M 1/42*      (2007.01)

(52) U.S. Cl.
CPC .......... *H02M 3/1584* (2013.01); *H02M 1/4225* (2013.01); *H02M 2003/1586* (2013.01); *Y02B 70/126* (2013.01)

(58) Field of Classification Search
CPC ..... G05F 1/00; H02M 3/1584; H02M 1/4225; H02M 2003/1586; Y02B 70/126
USPC ............................................ 323/222; 363/72
See application file for complete search history.

(56) References Cited

U.S. PATENT DOCUMENTS

| 7,706,151 B2 * | 4/2010 | Neidorff et al. ................... 363/9 |
| 2007/0253223 A1 | 11/2007 | Neidorff et al. |
| 2009/0230899 A1 * | 9/2009 | Arimura et al. .......... 318/400.01 |
| 2011/0199797 A1 | 8/2011 | Bridge et al. |

FOREIGN PATENT DOCUMENTS

| CN | 102307007 A | 1/2012 |
| TW | 201110514 A1 | 3/2011 |
| TW | I387187 B | 2/2013 |

OTHER PUBLICATIONS

Chin Yuan Liu et al., "A Novel SFVM Control Scheme for Two-Phase Interleaved CCM/DCM Boundary Mode Boost Converter in Power Factor Correction Applications", 2010, IEEE p. 906-911, ISBN 978-1424452866.*

(Continued)

*Primary Examiner* — Jessica Han
*Assistant Examiner* — Lorena Bruner
(74) *Attorney, Agent, or Firm* — Li&Cai Intellectual Property (USA) Office

(57) ABSTRACT

This instant disclosure provides a control method for interleaved multiphase Boost PFC converter. The interleaved multiphase Boost PFC converter has a master phase and a plurality of slave phases, the master phase operates in the critical conduction mode, the master of each slave phase has an inductor and a power switch. The control method comprises, configuring the phase difference between each slave phase and the master phase; setting up each slave phase to operate in the critical conduction mode; monitoring the operating mode of each slave phase is in the continuous conducting mode, the discontinuous conducting mode, or the critical conduction mode when the system is disturbed; and adjusting the power switch on time of the slave phase according to the operating mode of the slave phase so as to make the slave phase return to operate in critical conduction mode.

9 Claims, 14 Drawing Sheets

OTHER PUBLICATIONS

Chung-Ping Ku, A Novel SFVM-M3 Control Scheme for Interleaved CCM/DCM Boundary-Mode Boost Converter in PFC Applications, IEEE Transactions on Power Electronics, vol. 26, No. 8, Aug. 2011.

Laszlo Huber, et al., "Open-Loop Control Methods for Interleaved DCM/CCM Boundary Boost PFC Converters", IEEE Transactions on Power Electronics, vol. 23, No. 4, Jul. 2008.

* cited by examiner

CONTROL DEVICE FOR MULTIPHASE INTERLEAVED DC-DC CONVERTER AND CONTROL METHOD THEREOF

BACKGROUND OF THE INVENTION

1. Field of the Invention

The instant disclosure relates to a control method for a power converter; in particular, to a control device for multiphase interleaved DC-DC converter and control method thereof.

2. Description of Related Art

European Standard IEC 61000-3-2 limits the distortion of the current harmonics of the input current caused by the electrical equipment. In order to reduce the distortion of the current harmonics and achieve higher power factor, a boost converter is most utilized. The boost converter with a single phase is usually utilized for the circuit having power consumption less than 300 watts. For the circuit having power consumption larger than 300 watts, the current ripple rises fast, such that a large EMI filter is needed accordingly. The boost converter usually operates in critical conduction mode (CRM) for obtaining higher power converting efficiency. The peak of the inductor current is twice as large as the average current, thus the switching loss is less and the conduction loss is larger. When the output power ranges from 400 watts to 800 watts which is refer to medium power applications, the peak of the inductor current of the single phase CRM PFC converter would be too large, so as to result larger power loss, and it is not conducive to the component selection accordingly.

In order to take advantage of the critical conduction mode in high power applications, the multiphase interleaved boost power factor correction circuit operating in critical conduction mode has been extensively studied to decrease the peak value of the input current ripple.

However, the variation of the operation frequency of the multiphase interleaved boost power factor correction circuit operating in critical conduction mode is quite large, thus the design of the control circuit is relatively complicated. Conventionally, the interleaved control could be divided to the open-loop control and the close-loop control. Referring to Huber, L., Irving, B. T., Jovanoviċ, M. M., "Open-Loop Control Method for Interleaved DCM/CCM Boundary Boost PFC Converters," IEEE transactions on Power Electronics, vol. 23, no. 4, pp. 1649-1657, July 2008, the open-loop interleaved boost power factor correction circuit operating in critical conduction mode cannot return to a stable operating state when the turn-on signal is disturbed unless that the circuit operates in synchronized turn-on current mode (SNCM). On the other hand, the close-loop control needs a phase detector which usually is implemented by a phase-lock-loop (PLL) circuit for adjusting the phase difference. However, referring to Chung Ping Ku, Dan Chen, and Chin Yuan Liu, "A novel SFVM control scheme for two-phase interleaved CCM/DCM boundary mode boost converter in power factor correction applications," in IEEE ECCE 2010, pp. 906-911, 12-16 Sep. 2010, the price of the phase-lock-loop circuit is expensive, the design of the phase-lock-loop circuit is more complex, meanwhile the phase-lock-loop circuit has bandwidth limitations.

SUMMARY OF THE INVENTION

The object of the instant disclosure is to offer a control device for a multiphase interleaved DC-DC converter and a control method thereof which is applied for power factor improvement. Phase difference between master phase and slave phases is kept to a constant for operating in critical conduction mode without using the operational amplifier or the phase lock loop. When the system is disturbed, the system could recover to critical conduction mode quickly.

In order to achieve the aforementioned objects, according to an embodiment of the instant disclosure, a control device applied for a multiphase interleaved DC-DC converter is proposed. The multiphase interleaved DC-DC converter has a master phase and N slave phases, wherein N is a positive integer. The master phase operates in critical conduction mode, each slave phase has an inductor and a power switch series connected to the inductor. The control device comprises a plurality of zero current detection circuits and a plurality of On-Time adjustment circuits. The number of the zero current detection circuits is N, each zero current detection circuit is corresponding to each slave phase, the zero current detection circuit detects whether the inductor current of the corresponding slave phase decrease to zero, wherein the zero current detection circuit outputs a zero current detection signal when the inductor current of the corresponding slave phase decrease to zero. The number of the On-Time adjustment circuit is N. Each On-Time adjustment circuit is corresponding to each slave phase. Each On-Time adjustment circuit is coupled to the zero current detection circuit of the corresponding slave phase. The On-Time adjustment circuit outputs an On-Time adjusting signal according to the zero current detection signal generated by the zero current detection circuit of the corresponding slave phase. The On-Time adjusting signal is used for adjusting the on-time of the power switch of the corresponding slave phase, so as to make the corresponding slave phase operate in critical conduction mode.

In order to achieve the aforementioned objects, according to an embodiment of the instant disclosure, a control method applied for a multiphase interleaved DC-DC converter is proposed. The multiphase interleaved DC-DC converter has a master phase and a plurality of slave phases. The master phase operates in a critical conduction mode. Each slave phase has an inductor and a power switch series connected to the inductor. The control method comprises configuring the phase difference between each of the slave phases and the master phase; determining whether the operation mode of each slave phase is the critical conduction mode; determining that the operation mode of the disturbed slave phase is continuous mode, discontinuous mode or critical conduction mode when the operation mode of the slave phase is disturbed; and adjusting the on-time of the power switch of the corresponding slave phase according to the determined operation mode of the corresponding slave phase, so as to make the slave phase operate in critical conduction mode.

In summary, the control device for a multiphase interleaved DC-DC converter and the control method thereof simplify the control method of the multiphase interleaved DC-DC converter which is operating in critical conduction mode. During the process of changing on-time (turn-on time or conduction time) of the power switch and adjusting the operation mode, the predetermined phase difference between master phase and each slave phase could be maintained.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

This instant disclosure chooses the master-slave approach. The master phase comprises a conventional single phase power factor correction circuit. At least one slave phase keeps the phase of the master phase as a reference. A proper phase difference between the inductor current of the master phase and the inductor current of the slave phase are maintained. In the normal operation, the master phase operates in critical conduction mode, and the slave phase is delayed with a constant phase difference according to the master phase, so as to make the slave phase operate in critical conduction mode. In the instant disclosure, the switch turn-on signal of each slave phase is kept to have a constant phase difference differing from the master phase even if the on-time is changed due to external disturbing signals such that the slave phase may not operate in critical conduction mode. When the slave phase leaves from critical conduction mode, the instant disclosure adjusts the on-time of the slave phase to make the inductor current gradually go to critical conduction mode. According to the control method, a predetermined phase difference between the master phase and the slave phase could be maintained, so as to make each slave phase remain in or fast recover to critical conduction mode.

Further, in the conventional closed-loop control, when the phase difference between master phase and the slave phase are changed, a PID controller (proportional-integral-derivative controller) composed of the operational amplifier is usually utilized to correct the variations. However, the PID controller has a complex design process and the stability concern of the operational amplifier. In order to solve these problems, embodiments of the instant disclosure utilizes an on-time step adjustment method to adjust the on-time for replacing the PID controller. When the on-time of the slave phase needs to be adjusted, the on-time is changed once with a constant time in each switching cycle. The design process of the controller could be simplified, and the operational amplifier and the compensation for the element stability are not needed.

Figure 1:
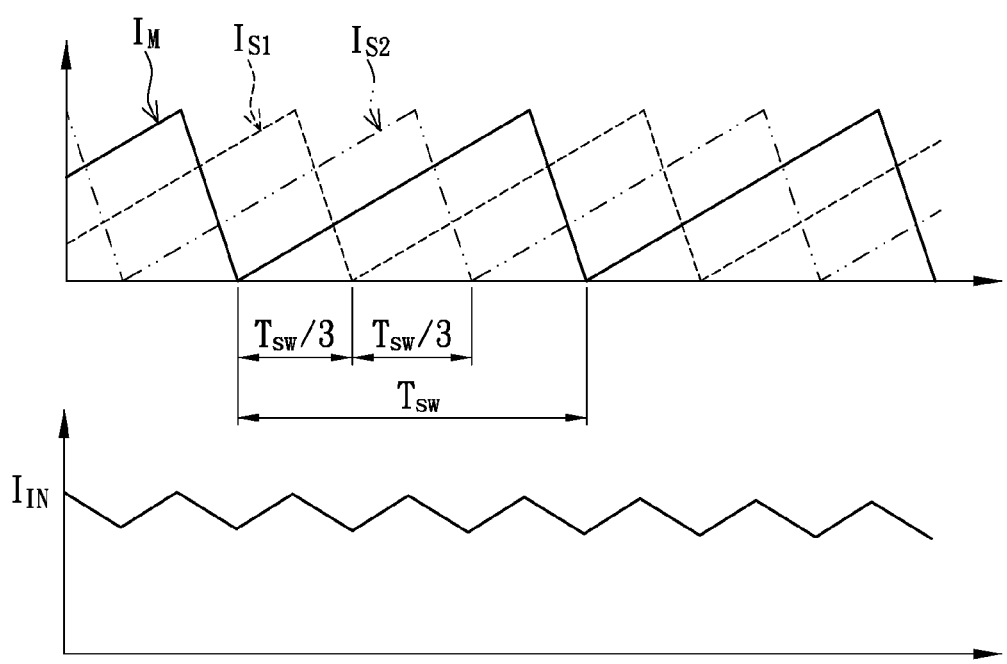
FIG. 1 shows a conventional waveform of the total current and the inductor current of each phase of an ideal three-phase interleaved converter.

Please refer to FIG. 1 showing a waveform of the total current and the inductor current of each phase of an ideal three-phase interleaved converter. In the ideal case, the phase difference between the inductor current of each converter is kept to a constant phase difference, so as to minimized the total current ripple. The converter in each phase is maintained in critical conduction mode. Taking three-phase interleaved master-slave approach as an example, three phases could be divided into one master phase and two slave phases, and the waveform of the inductor currents are shown in FIG. 1. $I_M$ is the inductor current of the master phase, $I_{S1}$ is the inductor current of the first slave phase, $I_{S2}$ is the inductor current of the second slave phase, and $I_{IN}$ is the total input current. When there is a delay with one-third switching period between the current $I_M$, $I_{S1}$ and $I_{S2}$ (i.e. the phase difference is 120°), the ripple of the total current $I_{IN}$ could be minimized.

Figure 2:
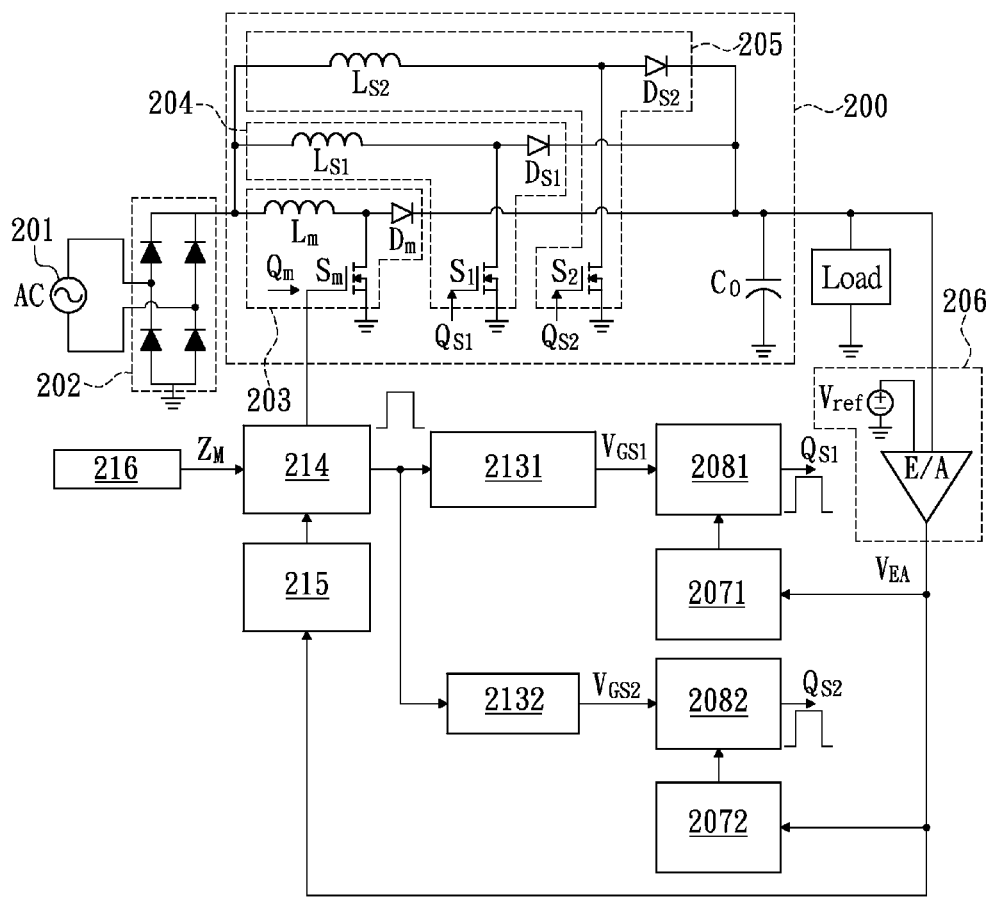
FIG. 2 shows a conventional circuit diagram of the three-phase interleaved converter operating in synchronized turn-on voltage mode.

Please refer to FIG. 2 showing a circuit diagram of the three-phase interleaved converter operating in synchronized turn-on voltage mode. The conventional three-phase interleaved boost circuit with synchronized turn-on in voltage mode 20 comprises a bridge rectifier 202, a boost converter 200 and a control circuit composed of a zero current detection circuit 216, phase delay circuits 2131, 3132, switching signal generators 214, 2081, 2082, constant On-Time generators 215, 2071, 2072, and an error amplifier 206. The bridge rectifier 202 rectifies the input alternating voltage 201 to provide a DC voltage to the power stage which is the boost converter 200 comprising a master phase 203, slave phases 204, 205 and a capacitor $C_O$. The master phase 203 has an inductor $L_m$, a diode $D_m$ and a power switch $S_m$. The slave phase 204 has an inductor $L_{S1}$, a diode $D_{S1}$ and a power switch $S_1$. The slave phase 205 has an inductor $L_{S2}$, a diode $D_{S2}$ and a power switch $S_2$.

The switch turn-on signal $Q_m$ of the master phase 203 is triggered by the zero current detection signal $Z_M$ generated by the zero current detection circuit 216. The switch turn-on signal $V_{GS1}$, $V_{GS2}$ are obtained with the switch conducting signal of the master phase 203 delayed with 120° and 240° by phase delay circuits 2131, 2132 respectively. The on-time of the power switches $S_m$, $S_1$, $S_2$ are determined by an error voltage $V_{EA}$ generated by the error amplifier 206 according to the output voltage (the voltage at the end connecting the capacitor $C_O$ and the load). The error voltage $V_{EA}$ could generate a voltage value corresponding to an on-time for the power switch, such that the constant On-Time generators 215, 2071 and 2072 could generate control signals representing a constant on-time. The mentioned control signals comprise turn-on signals and turn-off signals, and the control signals are transmitted to switching signal generators 214, 2081 and 2082. The switching signal generators 214, 2081 and 2082 generate signals to control the gates of the power switches $S_m$, $S_1$ and $S_2$, so as to control the on-time of the switches $S_m$, $S_1$ and $S_2$, such that each phase could operate in critical conduction mode. The slave phases 204 and 205 are controlled by the master phase 203, such that the phase errors may be produced between the master phase 203 and slave phases 204 and 205 when the turn-on signal of any slave phase is disturbed. The operating mode of the slave phases may not maintain in critical conduction mode.

Additionally, element mismatch or the disturbance factors may also cause the phase error between the master phase and the slave phase. Advance or delay turn-on signal may cause the inductor current of the slave phase enter the continuous conducting mode to result larger switching loss.

Figure 3A:
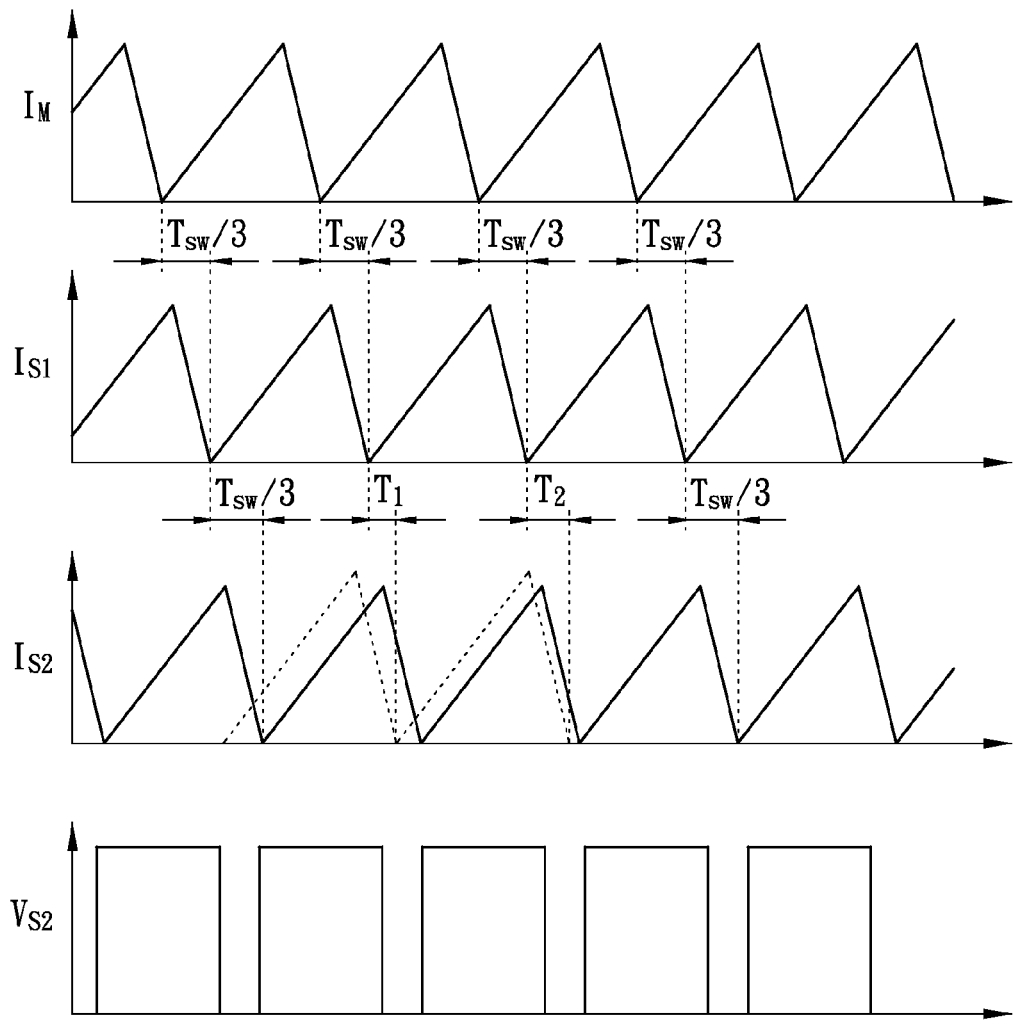
FIG. 3A shows a conventional circuit diagram of the three-phase interleaved converter operating in synchronized turn-on current mode.
Figure 3B:
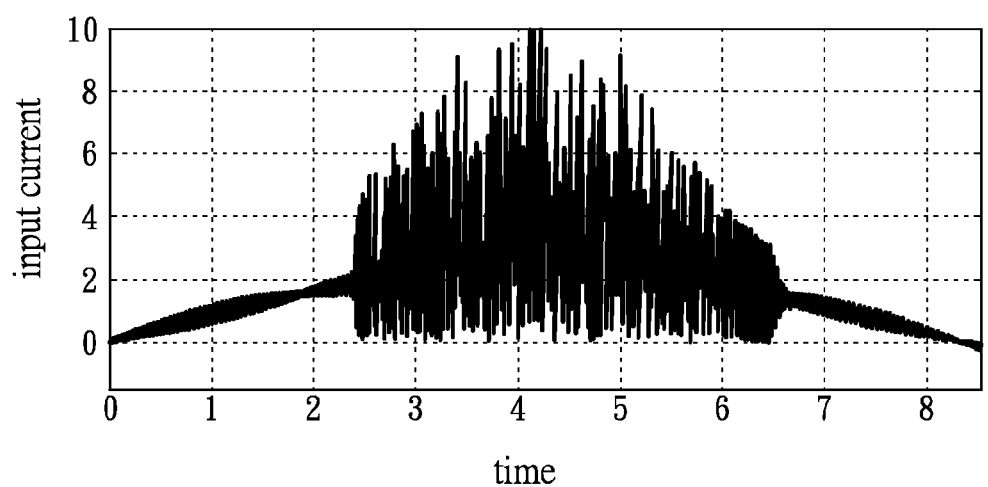
FIG. 3B shows a divergent current waveform of the disturbed input current of the three-phase interleaved circuit.

Please refer to FIG. 3A showing a conventional circuit diagram of the three-phase interleaved converter operating in synchronized turn-on voltage mode. The inductor current of the master phase is $I_M$, the inductor current of the first slave phase is $I_{S1}$, and the inductor current of the second slave phase is $I_{S2}$. The switch conducting signal of the second slave phase is $V_{GS2}$, and $T_{SW}$ is the switching period of the power switch. The conventional control manner makes each phase operate in critical conduction mode, but the phase difference between each phase may be disturbed to deviate from normal operation. Therefore, the conduction time needs to be adjusted to restore the phase difference. Without proper adjusting the conduction time, the waveform of current may be divergent. As shown in FIG. 3A, when the conducting signal $V_{GS2}$ of the second slave phase is disturbed (dashed line), the phase difference of the inductor currents between the second slave phase and the first slave phase could not kept to one-third of the switching period, even though the inductor current may still operate in critical conduction mode. Referring to the waveforms of the inductor currents $I_{S1}$ and $I_{S2}$ shown in FIG. 3A, the time periods $T_1$, $T_2$ and $T_{SW/3}$ do not have the same time length. FIG. 3B shows a divergent current waveform of the disturbed input current of the three-phase interleaved circuit. The conventional control method could not provide proper adjustment for the conduction time, and the inductor current may diverge so as to result the distortion of the input current $I_{IN}$.

Figure 3C:
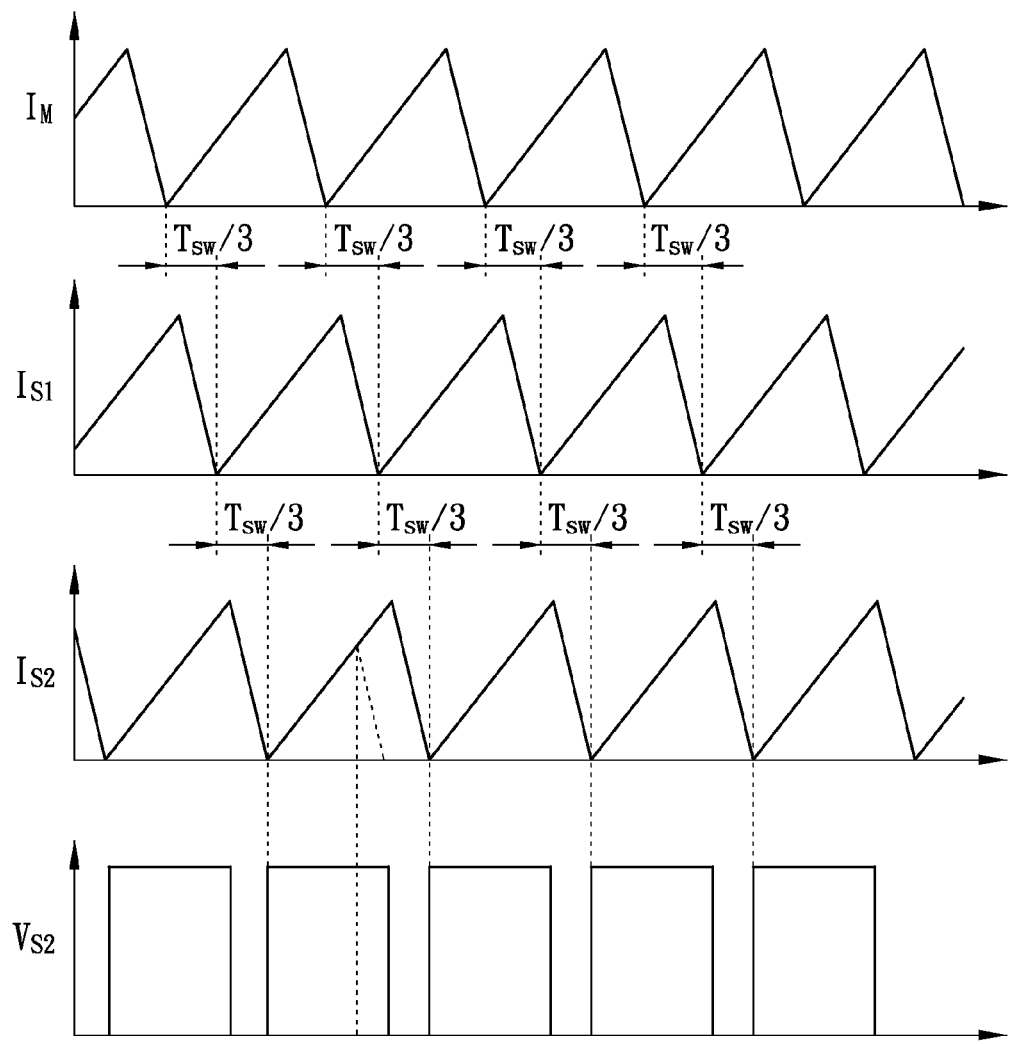
FIG. 3C shows a waveform of the inductor currents of the master/slave phases and the switching signal according to an embodiment of the instant disclosure.

However, the proposed disclosure provides a control method to keep the phase difference between each phase to be one-third switching cycle even though the inductor current $I_{S2}$ of the second slave phase is disturbed (referring to FIG. 3C).

In this embodiment, the reference voltage (including the error voltage $V_{EA}$ and the On-Time adjusting signal which is described hereinafter) received by the constant On-Time generator (e.g. constant On-Time generators 2071 and 2072 shown in FIG. 2) is adjusted to change the conduction time in order to make the operating mode of the slave automatically recover to normal operation after the slave phase is disturbed. The conducting signal of the slave phase is obtained by the phase delay circuit 2131 and 2132 which delay the conducting signal of the master phase, and the phase difference is constant. Thus, it only needs to adjust the conduction time point for ensuring that the slave phase operates in critical conduction mode.

When the number of phases enlarges, the more the advantages of embodiments of the invention would subsequently stand out. Because the conventional method is to adjust the phase difference of each phase and the phase difference between each phase would be related to each other no matter the master-slave approach or the democratic approach is adopted. When there is only two phases, the conventional control method seems simple. However, when the number of the phases enlarges, the conventional control method would be more complicated. Referring to U.S. Pat. No. 7,706,151 and U.S. Pat. No. 7,701,730 disclose the democratic approach which is simple for two-phase interleaved control, but the democratic approach needs two groups of two-phase interleaved control to control each other which is complicated. In contrast, the embodiments of the proposed disclosure force to maintain the phase difference and the phase difference which is constant are depend on the number of the interleaved phases. The phases are not depending to each other, and each phase do not need to co-ordinate to others for obtaining a proper phase difference related to the master phase.

Figure 4:
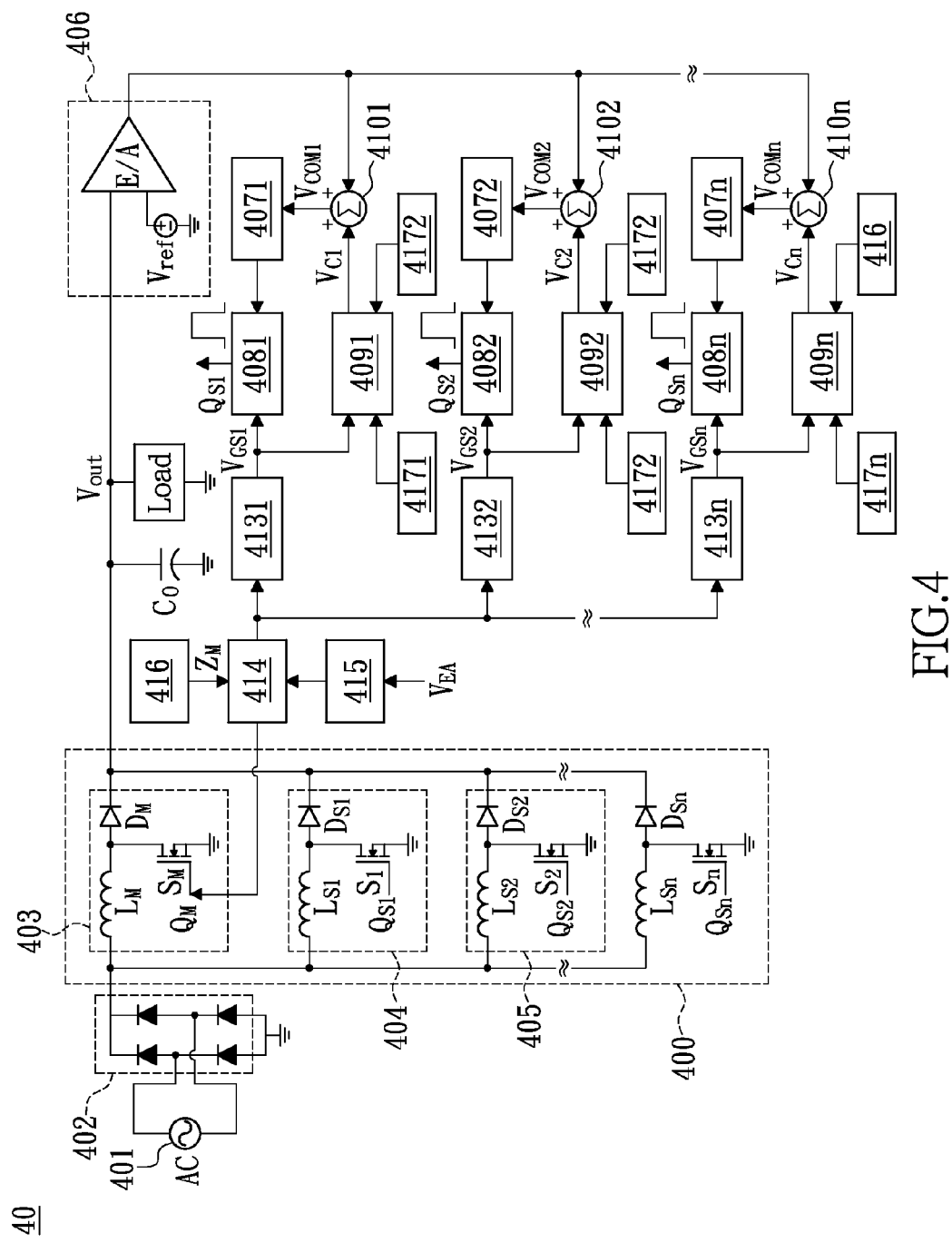
FIG. 4 shows a circuit diagram of a control device for multiphase interleaved boost converter according to an embodiment of the instant disclosure.

Please refer to FIG. 4 showing a circuit diagram of a control device for multiphase interleaved boost converter according to an embodiment of the instant disclosure. In this embodiment, the multiphase interleaved DC-DC converter is a multiphase interleaved boost converter. The circuit 40 comprises a bridge rectifier 402, a boost converter 400 and the control circuit composed of a zero current detection circuit 416, phase delay circuits 4131, 4132, switching signal generators 414, 4081, 4082, constant On-Time generators 415, 4071, 4072, 407n and an error amplifier 406. The bridge rectifier 402 rectifies the input alternating voltage 401 to provide a DC voltage to the power stage which is the boost converter 400 comprising a master phase 403, slave phases 404, 405 and a capacitor $C_O$. The master phase 403 has an inductor Lm, a diode $D_m$ and a power switch $S_m$. The slave phase 404 has an inductor $L_{S1}$, a diode $D_{S1}$ and a power switch $S_1$. The slave phase 405 has an inductor $L_{S2}$, a diode $D_{S2}$ and a power switch $S_2$.

Referring to FIG. 4 again. When utilizing the circuit for on-time adjustment, the zero current detection signal of the zero current detection circuit 416 in the master phase 403, the zero current detection signal of the zero current detection circuit 4171 in the first slave phase 404 and the zero current detection signal of the zero current detection circuit 4172 in the second slave phase 405 are input to On-Time adjustment circuits 4091 and 4092 for operation mode determining respectively. The error voltage $V_{EA}$ and the output voltages $V_{C1}$ and $V_{C2}$ of the On-Time adjustment circuit 4091 and 4092 are input to the adders 4101 and 4102 respectively. The adders 4101 and 4102 generate the reference voltage $V_{COM1}$ and $V_{COM2}$ for inputting to the constant On-Time generator 4071 and 4072. By means of adding more slave phases and the corresponding on-time adjustment circuits, the circuit could be applied to a multiphase interleaved power factor correction circuit.

In other words, this embodiment provides a control device applied for a multiphase interleaved DC-DC converter. The multiphase interleaved DC-DC converter has a master phase and N slave phases, wherein N is a positive integer. The master phase operates in critical conduction mode. Each slave phase has an inductor and a power switch series connected to the inductor, such as the inductor $L_{S1}$ and the power switch $S_1$ of the slave phase 404, and the inductor $L_{Sn}$ and the power switch $S_n$ of the N-th slave phase.

The control device comprises N+1 zero current detection circuits and N On-Time adjustment circuits. These N+1 zero current detection circuits are zero current detection circuits 416, 4171, 4172, 417n . . . etc. These N On-Time adjustment circuits are On-Time adjustment circuits 4091, 4092, 409n . . . etc. Each zero current detection circuit is corresponding to each slave phase. For example, zero current detection circuit 4171 and 4172 are corresponding to slave phases 404 and 405 respectively. The zero current detection circuit detects whether the inductor current of the corresponding slave phase is zero. The zero current detection circuit outputs a zero current detection signal when the inductor current of the corresponding slave phase is zero-crossing.

Each On-Time adjustment circuit is corresponding to each slave phase, for example, On-Time adjustment circuits 4091 and 4092 are corresponding to slave phases 404 and 405. Each On-Time adjustment circuit is coupled to the zero current detection circuit of the corresponding slave phase, for example, On-Time adjustment circuits are coupled to the zero current detection circuits 4171 and 4172. Each On-Time adjustment circuit outputs an On-Time adjusting signal (Vc1, Vc2 . . . Vcn) according to the zero current detection signal generated by the zero current detection circuit of the corresponding slave phase. The On-Time adjusting signal is used for adjusting the conduction time of the power switch of the corresponding slave phase, so as to make the corresponding slave phase operate in critical conduction mode.

In other words, as shown in FIG. 4, the On-Time adjustment circuit 4091 of the first slave phase 404 receives the zero current detection signal $Z_S$ (generated by the zero current detection circuit 4171) of the first slave phase 404, and the On-Time adjustment circuit 4091 of the first slave phase 404 also receives the zero current detection signal $Z_{S2}$ (generated by the zero current detection circuit 4172) of the second slave phase 405. Further, the On-Time adjustment circuit 4092 of the second slave phase 405 receives the zero current detection signal $Z_{S2}$ (generated by the zero current detection circuit 4172) of the first slave phase 405, and the On-Time adjustment circuit 4092 of the first slave phase 405 also receives the zero current detection signal $Z_{S3}$ (generated by the zero current detection circuit 4173) of the third slave phase. Further, when the slave phase is the last slave phase (i.e. N-th slave phase), On-Time adjustment circuit 409n of the N-th slave phase receives the zero current detection signal $Z_{Sn}$ (generated by the zero current detection circuit 417n) of the N-th slave phase, and the On-Time adjustment circuit 409n of the first slave phase 405 also receives the zero current detection signal $Z_M$ (generated by the zero current detection circuit 416) of the master phase.

Referring to FIG. 4 again. The circuit shown in FIG. 4 shows N switching signal generators and N constant On-Time generators corresponding to N slave phases. Each switching signal generator is corresponding to one of the slave phases, and each switching signal generator controls the on-time of the power switch of the corresponding slave phase. Each constant On-Time generator outputs a control signal to the corresponding switching signal generator according to a reference voltage ($V_{COM1}$, $V_{COM2}$ . . . or $V_{COMn}$). The mentioned reference voltage is obtained through adding the On-Time adjusting signal and an error voltage $V_{EA}$ (or so called error signal) feedback from the output of the multiphase interleaved DC-DC converter by an adder (adder 4101, 4102 . . . etc.).

It is worth mentioning that the phase delay circuit 4131, 4132 and 413n (shown in FIG. 4) generates a switch conducting signals ($V_{GS1}$, $V_{GS2}$ . . . $V_{GSn}$) to the corresponding slave phase according to the phase of the master phase 403. Each switch conducting signal is corresponding to each slave phase, and each switch conducting signal is provided to the switching signal generator of the corresponding slave phase (which is the switching signal generators in On-Time adjustment circuits 4091 and 4092 respectively). Each switching signal generator controls the on-time of the power switch in the corresponding slave phase according to the corresponding On-Time adjusting signal and the control signal.

Figure 5:
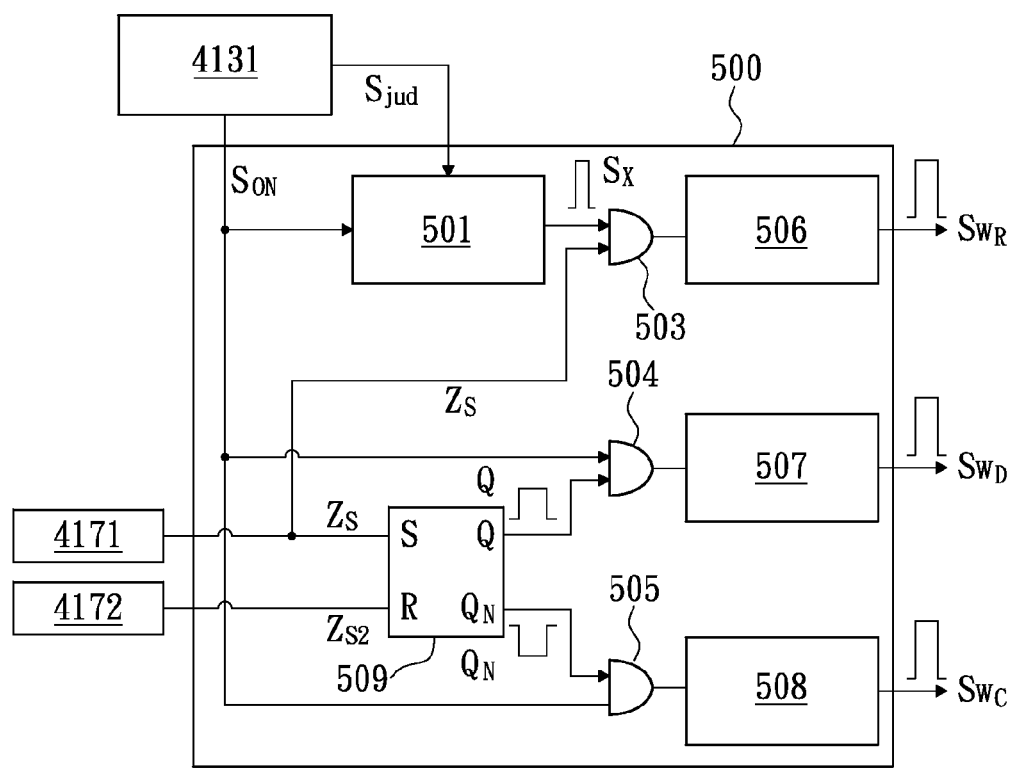
FIG. 5 shows a functional block diagram of an operation mode detecting unit according to an embodiment of the instant disclosure.

Please refer to FIG. 5 showing a functional block diagram of an operation mode detecting unit according to an embodiment of the instant disclosure. The instant disclosure provides a method to change the on-time of the switch according to determining the operation mode of the slave phase, so as to keep the slave phase in critical conduction mode. As shown in FIG. 5, an operation mode detecting unit 500 is for determining the present operation mode of the slave phase. The operation mode detecting unit 500 determines the operation mode is (a) discontinuous conduction mode, (b) discontinuous conduction mode or (c) critical conduction mode. The operation mode detecting unit 500 utilizes the phase delay circuit 4131 to generate a slave phase conducting signal $S_{ON}$ and a reference signal $S_{jud}$ earlier than the slave phase conducting signal $S_{ON}$ in timeline, and inputs these signals ($S_{jud}$ and $S_{ON}$) to a first constant width pulse generator 501 of the operation mode detecting unit 500. The first constant width pulse generator 501 generates a reference time-zone ($S_X$). When the reference time-zone $S_X$ and the zero current detection signal $Z_S$ (generated by the zero current detection circuit 4171) are triggered at the same time, a logic AND gate 503 generates a high voltage and the second constant width pulse generator 506 generate a constant width pulse $Sw_R$.

The input signals of the SR flip-flop 509 are the zero current detection signal $Z_S$ generated by the zero current detection circuit 4171 in the first slave phase and the zero current detection signal $Z_{S2}$ generated by the zero current detection circuit 4172 in the second slave phase. In the normal operation, the SR flip-flop 509 generates a square wave Q and an inverted square wave $Q_N$ with a constant duty cycle. These square waves and the slave phase conducting signal $S_{ON}$ are input to logic AND gates 504 and 505. When the slave phase conducting signal $S_{ON}$ and the square wave Q are triggered at the same time, the third constant width pulse generator 507 generates a constant width pulse $Sw_D$. When the slave phase conducting signal $S_{ON}$ and the square wave $Q_N$ are triggered at the same time, the fourth constant width pulse generator 508 generates a pulse which has the same pulse width as the pulse ($Sw_D$) generated by third constant width pulse generator 507. According to the pulses generated by the second constant width pulse generator 506, the third constant width pulse generator 507 and the fourth constant width pulse generator 508, the present operation mode (which is continuous conduction mode, discontinuous conduction mode or critical conduction mode) of the converter could be known.

Figure 6A:
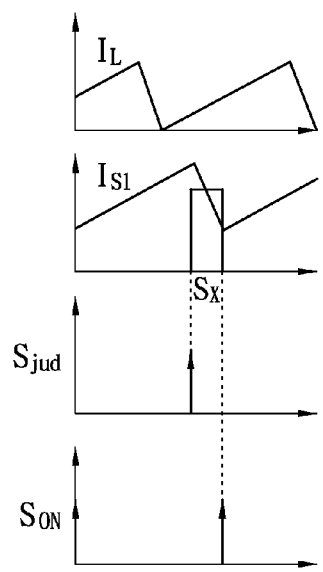
FIG. 6A shows an illustration of determining the continuous conduction mode according to an embodiment of the instant disclosure.
Figure 6B:
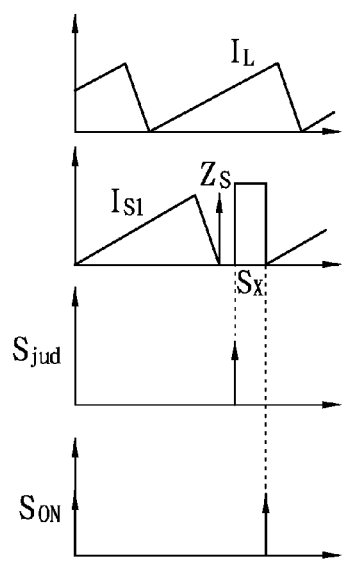
FIG. 6B shows an illustration of determining the discontinuous conduction mode according to an embodiment of the instant disclosure.
Figure 6C:
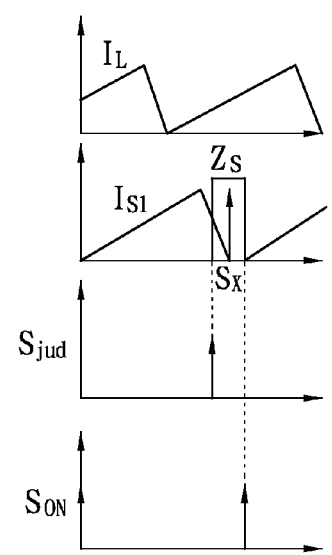
FIG. 6C shows an illustration of determining the critical conduction mode according to an embodiment of the instant disclosure.

Referring to FIG. 5, FIG. 6A, FIG. 6B and FIG. 6C. FIG. 6A, FIG. 6B and FIG. 6C show illustrations of determining the continuous conduction mode, discontinuous conduction mode and critical conduction mode. The relative positions of the zero current detection signal $Z_S$ and the reference time-zone $S_X$ in timeline are the basis for judgment. When there is no zero current detection signal $Z_S$ in the reference time-zone $S_X$, the operation mode detecting unit 500 determines that the corresponding slave phase operates in continuous conduction mode, as shown in FIG. 6A. When the zero current detection signal $Z_S$ is earlier than the reference time-zone $S_X$ in timeline, operation of the corresponding slave phase is determined to discontinuous conduction mode, as shown in FIG. 6B. When the zero current detection signal $Z_S$ is located in the reference time-zone $S_X$, operation of the corresponding slave phase is determined to critical conduction mode, as shown in FIG. 6C. When the operation mode is continuous conduction mode, the reference voltage of the constant On-Time generator could be decreased (by means of adjusting the on-time through the On-Time adjusting signal) to make the slave phase operate in critical conduction mode. When the operation mode is discontinuous conduction mode, the reference voltage of the constant On-Time generator could be increased to make the slave phase operate in critical conduction mode. When the operation mode is critical conduction mode, the reference voltage of the constant On-Time generator is not changed.

In other words, the operation mode detecting unit 500 receives the zero current detection signal $Z_S$ generated by the zero current detection circuit (4171) of the corresponding slave phase, and makes following determinations: (a) determining whether the zero current detection signal $Z_S$ exist; (b) determining whether the zero current detection signal $Z_S$ is generated earlier than a predetermined reference time-zone ($S_X$); and (c) determining whether the zero current detection signal $Z_S$ is generated in the predetermined reference time-zone ($S_X$). The predetermined reference time-zone ($S_X$) represents the zero-crossing time of the inductor current when the corresponding slave phase operates in critical conduction mode. The operation mode detecting unit determines the slave phase operates in continuous conduction mode when the zero current detection signal $Z_S$ does not exist. The operation mode detecting unit determines the slave phase operates in discontinuous conduction mode when the zero current detection signal $Z_S$ is generated earlier than the predetermined reference time-zone ($S_X$). The operation mode detecting unit determines the slave phase operates in critical conduction mode when the zero current detection signal $Z_S$ is generated in the predetermined reference time-zone ($S_X$).

Referring to FIG. 5 again. More specifically, the operation mode detecting unit 500 comprises the phase delay circuit 4131, the first constant width pulse generator 501, a first logic AND gate 503, the SR flip-flop 509, the second logic AND gate 504, the third logic AND gate 505, the second constant width pulse generator 506, the third constant width pulse generator 508. The phase delay circuit 4131 generates the slave phase conducting signal $S_{ON}$ and the reference signal $S_{jud}$. The reference signal $S_{jud}$ is earlier than the slave phase conducting signal $S_{ON}$ in timeline. The first constant width pulse generator 501 receives the slave phase conducting signal $S_{ON}$ and the reference signal $S_{jud}$, and generates a reference time-zone pulse signal representing the predetermined reference time-zone $S_X$ according to the time-zone of the reference signal $S_{jud}$ and the slave phase conducting signal $S_{ON}$.

The first logic AND gate 503 receives the reference time-zone pulse signal and the corresponding zero current detection signal $Z_S$ of the slave phase, and outputs a first judgment signal $Sw_R$ representing the slave phase operates in critical conduction mode when the reference time-zone pulse signal and the zero current detection signal $Z_S$ are logic "1". The SR flip-flop 509, has a setting end (S), a re-setting end (R), a positive output (Q) and an inverted output ($Q_N$). The setting end (S) receives the zero current detection signal of the slave phase (e.g. the zero current detection signal $Z_S$, wherein the slave phase is the first slave phase), the re-setting end (R) receives the zero current detection signal (e.g. the zero current detection signal $Z_{S2}$, wherein the slave phase is the first slave phase) of the adjacent slave phase (e.g. the second slave phase adjacent to the first slave phase). The second logic AND gate 504 receives the slave phase conducting signal and the output signal of the positive output, and outputs a second judgment signal $Sw_D$ representing the slave phase operates in discontinuous conduction mode when the slave phase conducting signal and the output signal of the positive output (Q) are logic "1". The third logic AND gate 505 receives the slave phase conducting signal and the output signal of the inverted output ($Q_N$), and outputs a third judgment signal $Sw_C$ representing the slave phase operates in continuous conduction mode when the slave phase conducting signal and the output signal of the inverted output are logic "1".

The second constant width pulse generator 506 is coupled to the output of the first logic AND gate 503. The third constant width pulse generator 507 is coupled to the output of the second logic AND gate 504. The fourth constant width pulse generator 508 is coupled to the output of the third logic AND gate 505.

Figure 7A:
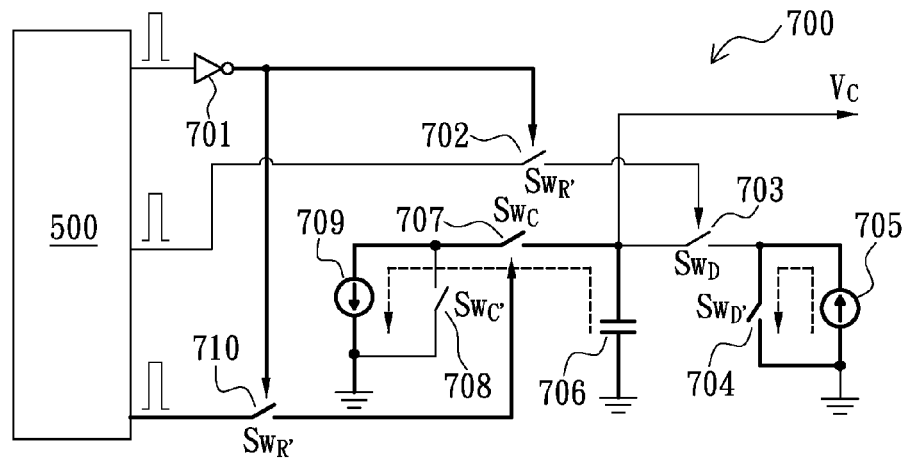
FIG. 7A shows an illustration of an On-Time adjustment circuit when the corresponding slave phase operates in continuous conduction mode according to an embodiment of the instant disclosure.
Figure 7B:
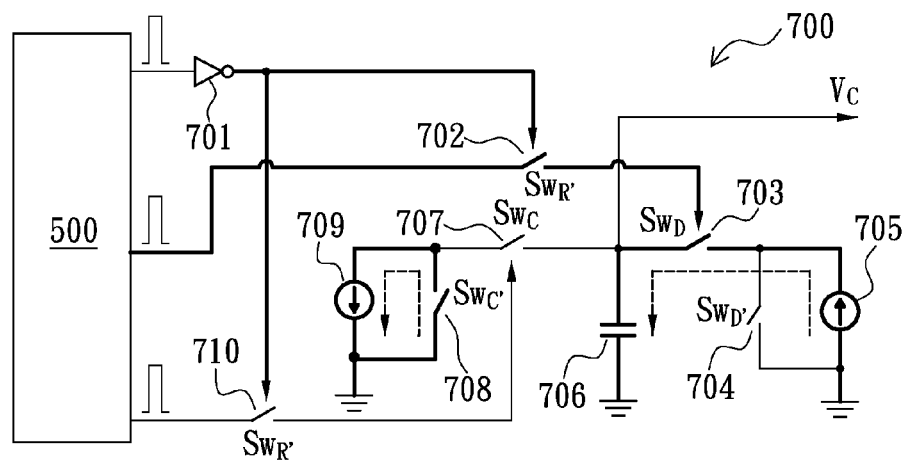
FIG. 7B shows an illustration of an On-Time adjustment circuit when the corresponding slave phase operates in discontinuous conduction mode according to an embodiment of the instant disclosure.
Figure 7C:
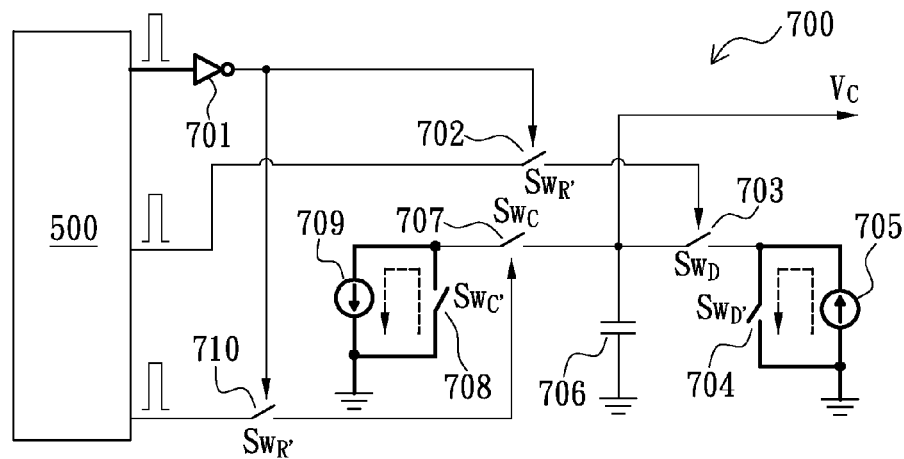
FIG. 7C shows an illustration of an On-Time adjustment circuit when the corresponding slave phase operates in critical conduction mode according to an embodiment of the instant disclosure.

Referring to FIG. 5, FIG. 7A, FIG. 7B and FIG. 7B. FIG. 7A shows an illustration of an On-Time adjustment circuit when the corresponding slave phase operates in continuous conduction mode. FIG. 7B shows an illustration of an On-Time adjustment circuit when the corresponding slave phase operates in discontinuous conduction mode. FIG. 7C shows an illustration of an On-Time adjustment circuit when the corresponding slave phase operates in critical conduction mode. When the operation mode detecting unit 500 determines the slave phase operates in continuous conduction mode, the fourth constant width pulse generator 508 outputs a constant width pulse ($Sw_C$) to make the switch 707 turnon for a period of time. Therefore, the capacitor 706 is discharged by the current source 709, and the voltage Vc across the capacitor 706 is decreased accordingly, as shown in FIG. 7A. According to the equation (1):

$$\frac{I}{C} \times \Delta t = \Delta V_C,$$

the voltage change of the voltage Vc could be calculated, in which I is the current source, C is the capacitor, $\Delta t$ is the pulse width, $\Delta Vc$ is the change of the voltage Vc across the capacitor 706. When the operation mode detecting unit 500 determines the operation mode is discontinuous mode, the third constant width pulse generator 507 output a pulse with the same width to turnon the switch 703, such that the current source 705 charges the capacitor 706 to increase the voltage Vc, as shown in FIG. 7B. When the operation mode is determined as critical conduction mode by the operation mode detecting unit 500, the second constant width pulse generator 506 outputs a pulse, than an logic NOT gate 701 turns off the first switch 710 and the second switch 702, meanwhile the voltage Vc across the capacitor 706 is kept as a constant voltage, as shown in FIG. 7C.

Figure 8:
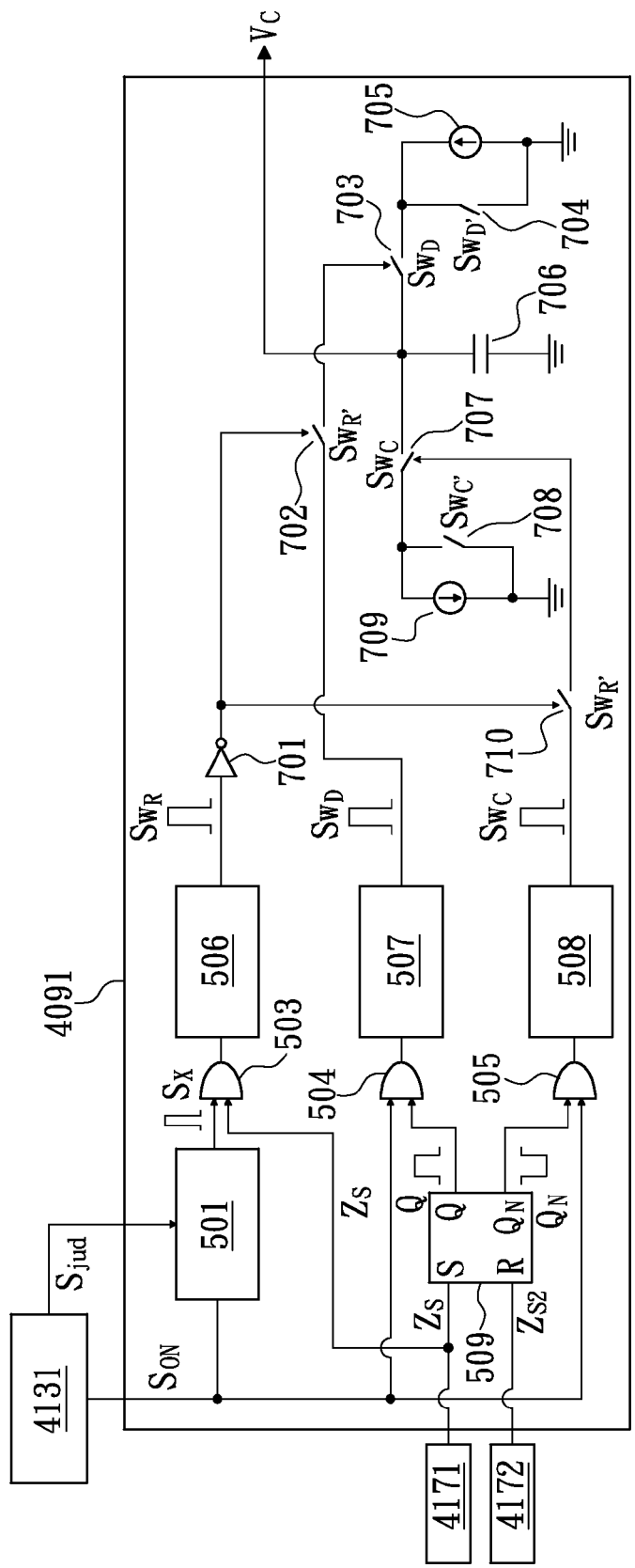
FIG. 8 shows a circuit diagram of an On-Time adjustment circuit according to an embodiment of the instant disclosure.

Referring to FIG. 8 showing a circuit diagram of an On-Time adjustment circuit according to an embodiment of the instant disclosure. In other words, the On-Time adjustment circuit 4091 comprises the capacitor 706, the logic NOT gate 701, the first switch 710, the second switch 702, the third switch 707, the fourth switch 703, the first current source 709 and the second current source 705 except the elements shown in FIG. 5.

A first end of the capacitor 706 is coupled to the ground GND, and a voltage level Vc of a second end of the capacitor 706 is utilized as the On-Time adjusting signal of the On-Time adjustment circuit. The input of the logic NOT gate 701 is coupled to the output of the second constant width pulse generator 506. The first switch 710 is controlled by the output of the logic NOT gate 701, and the first switch 710 is turned on when the second constant width pulse generator 506 does not generate any pulse. The second switch 702 is controlled by the output of the logic NOT gate 701, and the second switch 702 is turned on when the second constant width pulse generator 506 does not generate any pulse.

The third switch 707 is coupled between the second end of the capacitor 706 and the first current source 709. The third switch 707 is controlled by the pulse generated by the fourth constant width pulse generator 508 through the first switch 710. The third switch 707 is turned on when the fourth constant width pulse generator 508 generates the pulse, so as to discharge the capacitor 706 through the first current source 709.

The fourth switch 703 is coupled between the second end of the capacitor 706 and the second current source 705. The fourth switch 703 is controlled by the pulse generated by the third constant width pulse generator 507 through the second switch 702. The fourth switch 703 is turned on when the third constant width pulse generator 507 generates the pulse, so as to charge the capacitor 706 through the second current source 705. The first switch 710 and the second switch 702 are turned off when the second constant width pulse generator 506 generates the pulse, so as to maintain the voltage level (output voltage Vc) of the second end of the capacitor 706.

The changed voltage (Vc) across the capacitor 706 is utilized to change the reference voltage (which is the On-Time adjusting signal) for the constant on-time, so as to make the disturbed inductor current go back to normal operation. Combination of the operation mode detecting unit 500 and the step on-time adjustment circuit is the On-Time adjustment circuit 4091, as shown in FIG. 8.

Figure 9A:
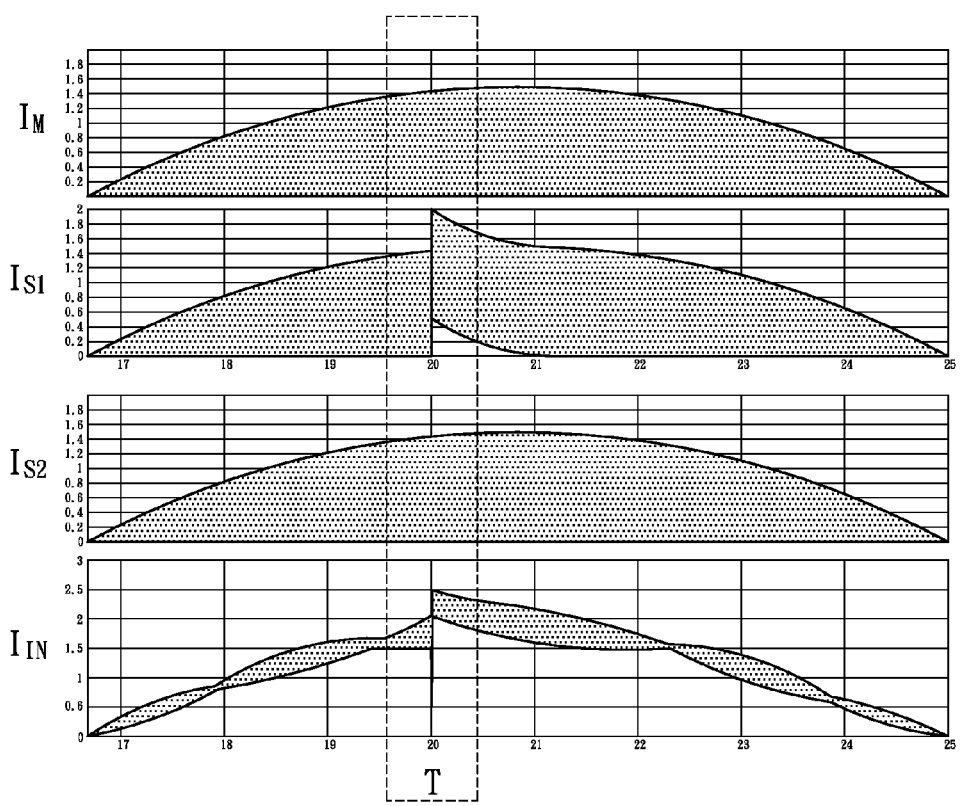
FIG. 9A shows a conventional waveform of the disturbed inductor currents and the input current without adjusting the on-time.
Figure 9B:
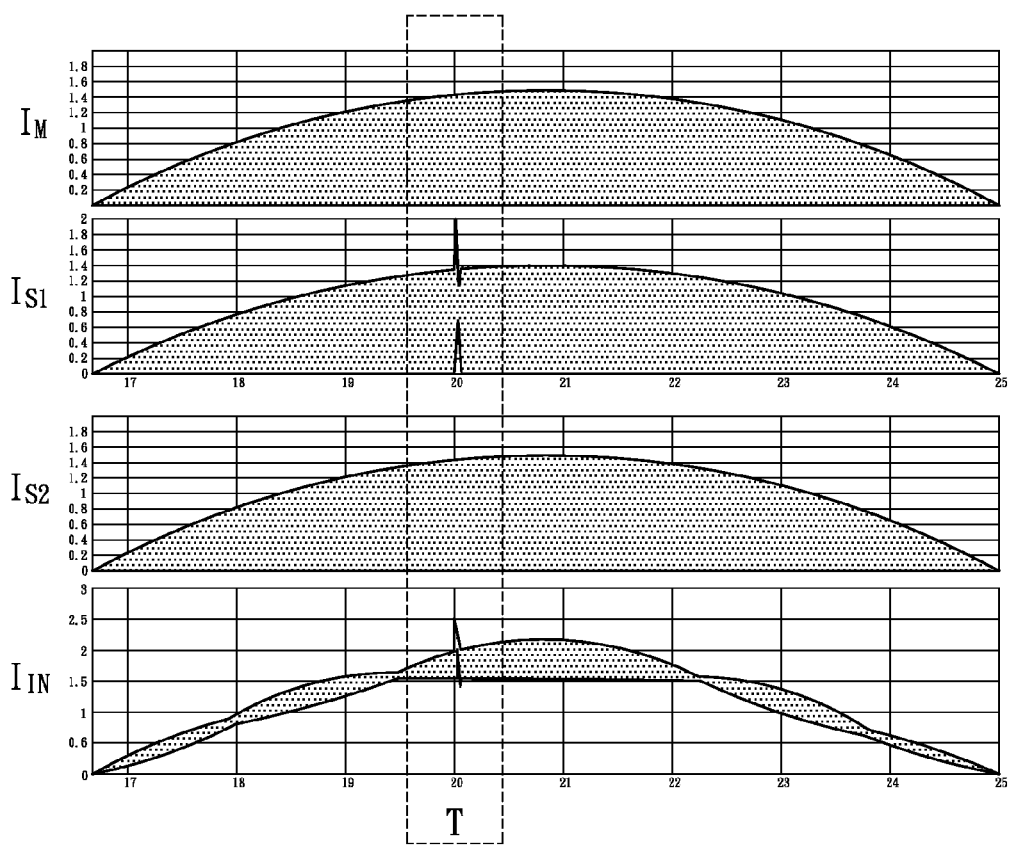
FIG. 9B shows a waveform of the disturbed inductor currents and the input current according to an embodiment of the instant disclosure.

Referring to FIG. 9A and FIG. 9B, FIG. 9A shows a conventional waveform of the disturbed inductor currents and the input current without adjusting the conduction time, FIG. 9B shows a waveform of the disturbed inductor currents and the input current according to an embodiment of the instant disclosure. $I_M$ is the inductor current of the master phase, $I_{S1}$ is the inductor current of the first slave phase, $I_{S2}$ is the inductor current of the second slave phase, and $I_{IN}$ is the total input current (or so called total current). Take three phases interleaved converter operating in critical conduction mode as an example, when the turn-on signal of the slave phase is disturbed at the time-point T and there is no any adjusting operation is applied, the inductor current $I_{S1}$ of the first slave phase would turn to continuous conduction mode, as shown in FIG. 9A. When applying the control method disclosed in the instant disclosure, the current would recover to critical conduction mode in a short time after being disturbed at the time-point T.

Figure 10:
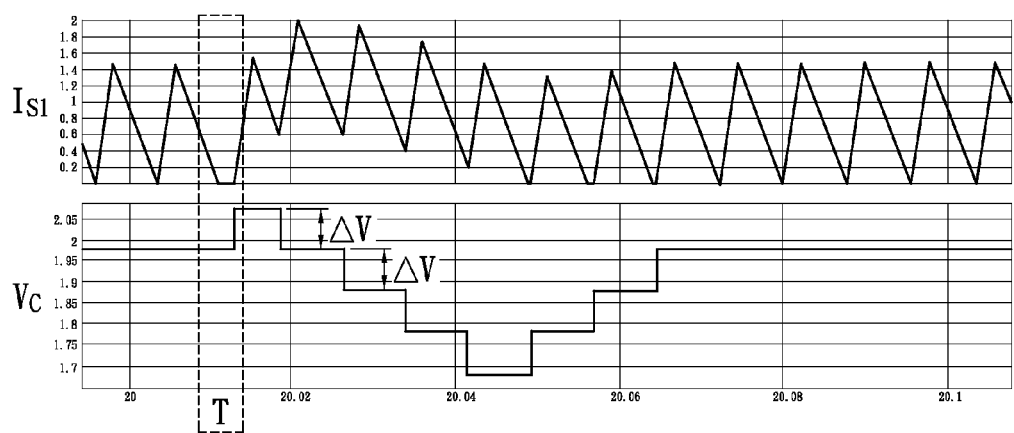
FIG. 10 shows a waveform of the disturbed inductor current of a slave phase and an output voltage of an On-Time adjustment circuit during adjusting period after the inductor current is disturbed according to an embodiment of the instant disclosure.

Referring to FIG. 10 showing a waveform of the disturbed inductor current ($I_{S1}$) of a slave phase and an output voltage ($V_C$, representing the On-Time adjusting signal) of an On-Time adjustment circuit during adjusting period after the inductor current is disturbed according to an embodiment of the instant disclosure. As shown in FIG. 10, the inductor current would not decrease to zero at the end of the switching cycle which operates in continuous conduction mode after the On-Time adjusting signal of the slave phase is disturbed at the time-point T. Meanwhile, decreasing the output voltage Vc could make the inductor current decrease to zero at the end of each switching cycle. However, when the voltage Vc is too low, the inductor current would decrease to zero in advance resulting to operate in discontinuous conduction mode. Thus, the output voltage $V_C$ could be increased to make the inductor current decrease to zero at the end of the switching cycle for operating in critical conduction mode.

Differing from the conventional control circuit which adjusts the conduction time of the power switch, the method disclosed in the instant disclosure do not employ an operational amplifier to change the reference voltage of the constant on-time, but utilizes a pulse with a controllable pulse width to charge/discharge a capacitor in order to change the output voltage Vc (which is the voltage across the capacitor). Because each period of the charging/discharging time is quite short, the output voltage Vc would be changed by a constant voltage ΔV at a time, as shown in FIG. 10. Changing of the output voltage Vc would not be stopped until the circuit shown in FIG. 7 determines the operation mode is critical conduction mode.

Figure 11:
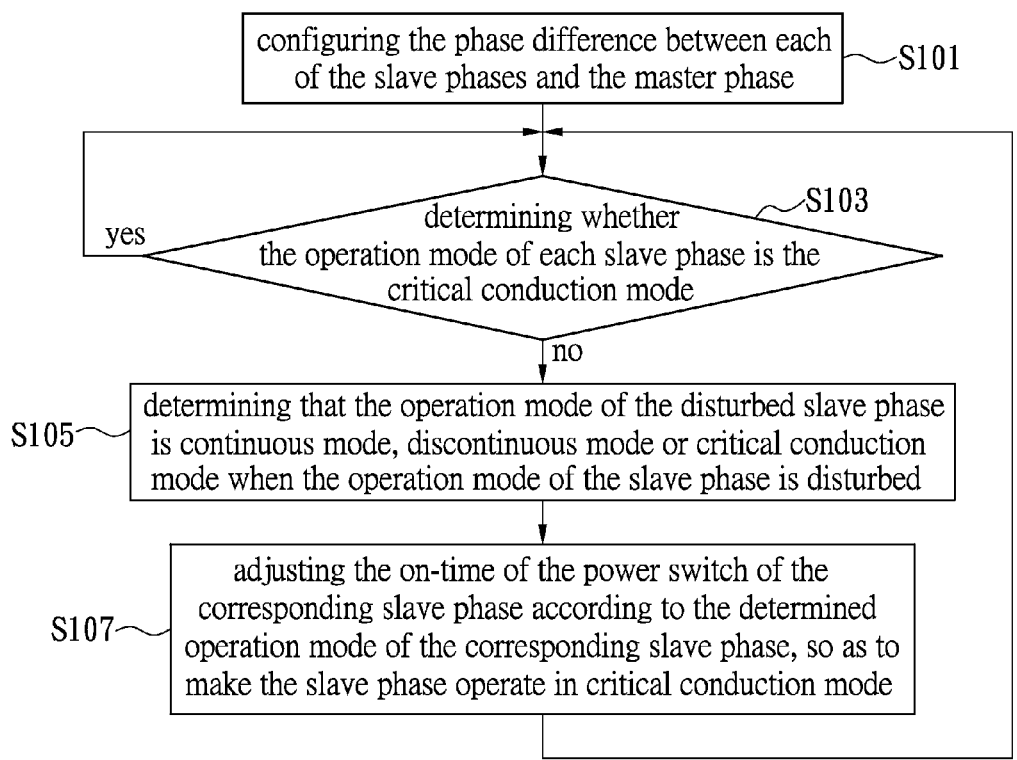
FIG. 11 shows a flow chart of the control method according to an embodiment of the instant disclosure.

Please refer to FIG. 5, FIG. 6 and FIG. 11. FIG. 11 shows a flow chart of the control method according to an embodiment of the instant disclosure. First, in step S101, configuring the phase difference between each of the slave phases and the master phase. Then, in step S103, determining whether the operation mode of each slave phase is critical conduction mode. Then, when the operation mode of the slave phase is disturbed (which may cause the operation leave critical conduction mode), go to step S105. When the operation mode of the slave phase is not disturbed (the mode is still in critical conduction mode), go to step S103.

In step S105, determining that the operation mode of the slave phase is continuous mode, discontinuous mode or critical conduction mode according to the time when the inductor current of the corresponding slave phase crosses zero current.

Then, in step S107, adjusting the on-time of the power switch of the corresponding slave phase according to the determined operation mode of the corresponding slave phase, so as to make the slave phase operate in critical conduction mode. In step S107, the power switch of the corresponding slave phase may be changed step by step. Additionally, the on-time of the power switch of each slave phase is changed with a predetermined time period every switching cycle. In other word, the output voltage could be changed by a predetermined voltage in each step, in which the predetermined voltage is corresponding to the predetermined time period. After the step S107, go to the step S103 again for processing the control in next cycle.

According to above descriptions, the control device for a multiphase interleaved DC-DC converter and the control method thereof employ a relative simple control manner to control the converter, thus the closed-loop interleaved control could be accomplished. In order to obtain the function of closed-loop interleaved control, determining the operation mode of each converter in each phase to increase/decrease the on-time of the power switch for making the inductor current of the multiphase interleaved power factor correction circuit operate in critical conduction mode.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A control device applied for a multiphase interleaved DC-DC converter, the multiphase interleaved DC-DC converter having a master phase and N slave phases, wherein N is a positive integer; the master phase operating in critical conduction mode, each slave phase having an inductor and a power switch series connected to the inductor, the control device comprising:

a plurality of zero current detection circuits, wherein the number of the zero current detection circuits is N, each zero current detection circuit is corresponding to one of said slave phases, the each zero current detection circuit detects whether the inductor current of the corresponding slave phase is zero, wherein the zero current detection circuit outputs a zero current detection signal when the inductor current of the corresponding slave phase is zero; and a plurality of On-Time adjustment circuits, wherein the number of the On-Time adjustment circuits is N, each On-Time adjustment circuit is corresponding to one of said slave phases, each On-Time adjustment circuit is coupled to the zero current detection circuit of the corresponding slave phase, the On-Time adjustment circuit outputs an On-Time adjusting signal according to the zero current detection signal generated by the zero current detection circuit of the corresponding slave phase;

wherein the On-Time adjusting signal is used for adjusting a conduction time of the power switch of the corresponding slave phase, so as to make the corresponding slave phase operate in critical conduction mode;

wherein the On-Time adjustment circuit comprises an operation mode detecting unit, wherein the operation mode detecting unit receives the zero current detection signal generated by the corresponding zero current detection circuit of the corresponding slave phase, and determines whether the zero current detection signal exists, determines whether the zero current detection signal is generated earlier than a predetermined reference time-zone, and determines whether the zero current detection signal is generated in the predetermined reference time-zone, wherein the predetermined reference time-zone represents the zero-crossing time of the inductor current when the corresponding slave phase operates in critical conduction mode;

wherein the operation mode detecting unit determines the corresponding slave phase operates in continuous conduction mode when the zero current detection signal does not exist, the operation mode detecting unit determines the slave phase operates in discontinuous conduction mode when the zero current detection signal is generated earlier than the predetermined reference time-zone, the operation mode detecting unit determines the slave phase operates in critical conduction mode when the zero current detection signal is generated in the predetermined reference time-zone;

wherein the operation mode detecting unit comprises:

a phase delay circuit, generating a slave phase conducting signal and a reference signal, the reference signal is earlier than the slave phase conducting signal in time-line;

a first constant width pulse generator, receiving the slave phase conducting signal and the reference signal, generating a reference time-zone pulse signal representing the predetermined reference time-zone;

a first logic AND gate, receiving the reference time-zone pulse signal and the corresponding zero current detection signal of the slave phase, outputting a first judgment signal representing the slave phase operates in critical conduction mode when the reference time-zone signal and the zero current detection signal are logic "1";

a SR flip-flop, having a setting end (S), a re-setting end (R), a positive output and an inverted output, the setting end receiving the zero current detection signal of the slave phase, the re-setting end receiving the zero current detection signal of a next slave phase;

a second logic AND gate, receiving the slave phase conducting signal and the output signal of the positive output, outputting a second judgment signal representing the slave phase operates in discontinuous conduction mode when the slave phase conducting signal and the output signal of the positive output are logic "1"; and a third logic AND gate, receiving the slave phase conducting signal and the output signal of the inverted output, outputting a third judgment signal representing the slave phase operates in continuous conduction mode when the slave phase conducting signal and the output signal of the inverted output are logic "1".

2. The control device according to claim 1, the operation mode detecting unit further comprising:

a second constant width pulse generator, coupled to the output of the first logic AND gate;

a third constant width pulse generator, coupled to the output of the second logic AND gate; and a fourth constant width pulse generator, coupled to the output of the third logic AND gate.

3. The control device according to claim 2, wherein the On-Time adjustment circuit further comprising:

a capacitor, a first end of the capacitor coupled to the ground, a voltage level of a second end of the capacitor utilized as the On-Time adjusting signal of the On-Time adjustment circuit;

a logic NOT gate, the input of the logic NOT gate coupled to the output of the second constant width pulse generator;

a first switch, controlled by the output of the logic NOT gate, wherein the first switch is turned on when the second constant width pulse generator does not generate any pulse;

a second switch, controlled by the output of the logic NOT gate, wherein the second switch is turned on when the second constant width pulse generator does not generate any pulse;

a third switch, coupled between the second end of the capacitor and a first current source, controlled by the pulse generated by the fourth constant width pulse generator through the first switch, wherein the third switch is turned on when the fourth constant width pulse generator generates the pulse, so as to discharge the capacitor through the first current source; and a fourth switch, coupled between the second end of the capacitor and a second current source, controlled by the pulse generated by the third constant width pulse generator through the second switch, wherein the fourth switch is turned on when the third constant width pulse generator generates the pulse, so as to charge the capacitor through the second current source;

wherein the first switch and the second switch are turned off when the second constant width pulse generator generates the pulse, so as to maintain the voltage level of the second end of the capacitor.

4. The control device according to claim 3, further comprising:

a plurality of switching signal generators, wherein the number of the switching signal generators is N, each switching signal generator corresponding to each slave phases, each switching signal generator controlling the on-time of the power switch of the corresponding slave phase;

a plurality of constant On-Time generators, wherein the number of the constant On-Time generators is N, each constant On-Time generator outputs a control signal to the corresponding switching signal generator according to a reference voltage, wherein the reference voltage is obtained by adding the On-Time adjusting voltage and an error voltage feedback from the output of the multiphase interleaved DC-DC converter by an adder.

5. The control device according to claim 4, further comprising:
a plurality of phase delay circuits, wherein the number of the phase delay circuit is N, each phase delay circuit generates a switching turn-on signal, each switch turn-on signal corresponding to each slave phase, each switch conducting signal provided to the switching signal generator of the corresponding slave phase;
wherein each switching signal generator controls the on-time of the power switch in the corresponding slave phase according to the corresponding On-Time adjusting signal and the control signal.

6. A control method applied for a multiphase interleaved DC-DC converter of claim 1, the multiphase interleaved DC-DC converter having a master phase and a plurality of slave phases, the master phase operating in a critical conduction mode, each slave phase having an inductor and a power switch series connected to the inductor, the control method comprising:
configuring the phase difference between each of the slave phases and the master phase;
determining whether the operation mode of each slave phase is critical conduction mode; and
determining that the operation mode of the disturbed slave phase is continuous mode, discontinuous mode or critical conduction mode when the operation mode of the slave phase is disturbed;
adjusting the on-time of the power switch of the corresponding slave phase according to the determined operation mode of the corresponding slave phase, so as to make the slave phase operate in critical conduction mode.

7. The control method according to claim 6, wherein determining the operation mode of the disturbed slave phase when the operation mode of the slave phase is disturbed further comprises:
determining that the operation mode of the slave phase is continuous mode, discontinuous mode or critical conduction mode according to the time when the inductor current of the corresponding slave phase crosses zero current.

8. The control method according to claim 6, wherein the on-time of the power switch of the corresponding slave phase is changed step by step.

9. The control method according to claim 8, wherein the on-time of the power switch of each slave phase is changed with a predetermined time period every switching cycle.

* * * * *